J. A. REYNOLDS.
Grain Drill.

No. 62,226.

Patented Feb. 19, 1867.

Witnesses:

Inventor:
J. A. Reynolds

United States Patent Office.

J. ALSTON REYNOLDS, OF SAVANNAH, GEORGIA.

Letters Patent No. 62,226, dated February 19, 1867.

IMPROVEMENT IN MACHINE FOR SOWING RICE.

*The Schedule referred to in these Letters Patent and making part of the same.*

TO ALL WHOM IT MAY CONCERN:

Be it known that I, JOSEPH A. REYNOLDS, of Savannah, in the county of Chatham, and State of Georgia, have invented a new and improved Machine for Sowing Rice and other seeds; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a new and improved machine for sowing rice and other seeds which are grown in small drills. The invention consists in the novel means employed for distributing the seed, and in an improved arrangement of furrow openers, as hereinafter fully shown and described, whereby a very simple and efficient implement for the purpose specified is obtained.

Figure 1:
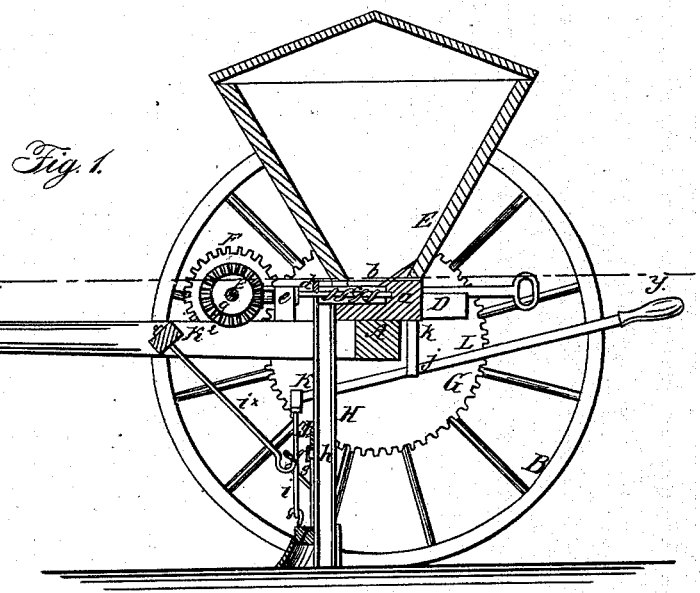
Figure 1 is a side sectional view of my invention, taken in the line $x\,x$, fig. 2.
Figure 2:
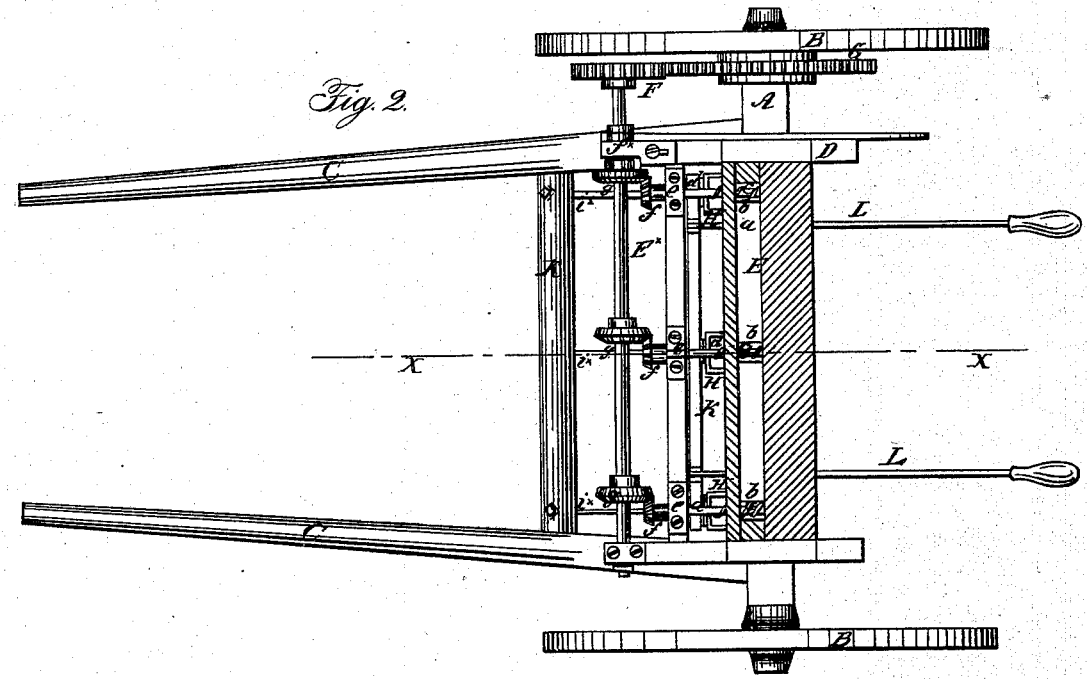
Figure 2 is a horizontal section of the same, taken in the line $y\,y$, fig. 1.

A represents an axle, having a wheel, B, on each end of it, and thills, C C, attached. On the axle A, and rear part of the thills C C, a rectangular frame, D, is secured, and on the rear part of frame D a seed-box or hopper E is placed, in the bottom $a$ of which there are made three grooves, $b$, parallel with the sides of the frame D, and equidistant from each other, as shown in fig. 2. In each of these grooves $b$ there is fitted a screw, $c$, said screws being formed on rods $d$, which extend through the front of the bottom $a$ of the seed-box, and have bearings, $e$, on a cross-bar of frame D, and bevel-pinions, $f$, on their front ends, which gear into bevel-wheels $g$ on a shaft, $E^*$. This shaft $E^*$ has a toothed wheel, F, on one end of it, which gears into a wheel, G, on the inner part of the hub of the wheels B. By this arrangement it will be seen that the screws $c$ are rotated as the implement is drawn along. H represents three upright tubes, which are secured at their upper ends to the front side of the bottom $a$ of the seed-box E, the rods $d$ passing through them. From the above description it will be seen that, as the machine is drawn along, the screws $c$ will discharge the seed from the seed-box or hopper E into the upper ends of the tubes H, the latter conveying the seed into the furrows. This seed-distributing apparatus may be rendered inoperative at any time by having the bearing $f^*$ of the shaft $E^*$, which is nearest the wheel F, arranged so as to slide, and admit of the wheel F being thrown out of gear with the wheel G. I represents furrow openers, which are placed on the tubes H, and allowed to slide freely thereon, each furrow opener having a plate, J, attached, and these plates are secured to the front sides of the tubes H by screws, $g^*$, which pass through vertical slots $h$ in the plates, said slots being sufficiently long to admit of a requisite degree of movement of said plates. (See fig. 1.) The furrow openers I are connected by rods $i$ to a bar, K, to which two levers, L L, are attached, said levers having their fulcra, $j$, in pendents, $k\,k$, attached to the bottom $a$ of the seed-box. It will be seen that the driver, by actuating the levers L L, may raise and lower the furrow openers I so that the seed may be planted at a greater or less depth, as desired, and the furrow openers raised entirely above the surface of the earth when required. The tubes H are braced by rods $i^*$ from the rear cross-bar $K^*$ of the thills C C.

What I claim as new, and desire to secure by Letters Patent, is—

1. The screws $c$ fitted in grooves $b$ of the bottom $a$ of the seed-box E, and operated from one of the wheels B by gearing arranged substantially in the manner as and for the purpose herein set forth.

2. The sliding or adjustable furrow openers I, applied to the tubes H, and arranged substantially as and for the purpose specified.

The above specification of my invention signed by me this 5th day of March, 1866.

J. ALSTON REYNOLDS.

Witnesses:
CHRIS. C. BURNETT,
JOS. J. GOLDWIRE.